TICKETER WITH MAGNETIC MEMORY

Filed Sept. 7, 1962 13 Sheets-Sheet 1

INVENTORS.
EDOARDO COTRONEO
GIORGIO PELLEGRINO
BY
C. A. Gullbrandsen
ATTY.

3,160,710
TICKETER WITH MAGNETIC MEMORY

Edoardo Cotroneo and Giorgio Pellegrino, Milan, Italy, assignors to Automatic Electric Laboratories, Inc., Northlake, Ill., a corporation of Delaware Filed Sept. 7, 1962, Ser. No. 221,956
4 Claims. (Cl. 179—7.1)

The present invention relates in general to automatic telephone systems and more particularly to improvement in automatic toll ticketing telephone systems arranged to produce an individual record of certain items of information pertaining to each toll telephone connection so that an appropriate charge may be assessed against the calling subscriber.

In the instant invention a new ticketer is presented incorporating a magnetic core memory system in which information concerning the calling and called subscriber's directory numbers as well as other information may be stored. Previously tickets incorporated a storage system wherein a group of relays were used to store each digit usually on a coded basis. A rotary switch is conventionally used to distribute information to these relays. A system of this type is shown in the co-pending application of J. M. Blackhall, No. 113,724, filed May 31, 1961. In the present system the multiplicity of storage relays are replaced by a small magnetic core memory occupying minimum space and having constant current requirements far below that of ticketers using relay memories for the recording of directory number information.

Accordingly the object of this invention is to provide a ticketer circuit for use in automatic toll ticketing telephone systems which employs solid state devices with their attendant reduction in both cost and size of the ticketer.

A feature of the ticketer according to the present invention is a memory circuit employing magnetic single aperture cores for the storage of directory number information on a coded basis.

Another feature is the inclusion of a solid state device reader circuit usable for transferring information from the magnetic core memory to a conventional tabulator circuit.

Still another feature is the inclusion of a timer circuit that while employing electromechanical techniques for registering the duration of a telephone conversation can have this information transferred by the same reader circuit utilized for the magnetic core memory.

Figure 1:
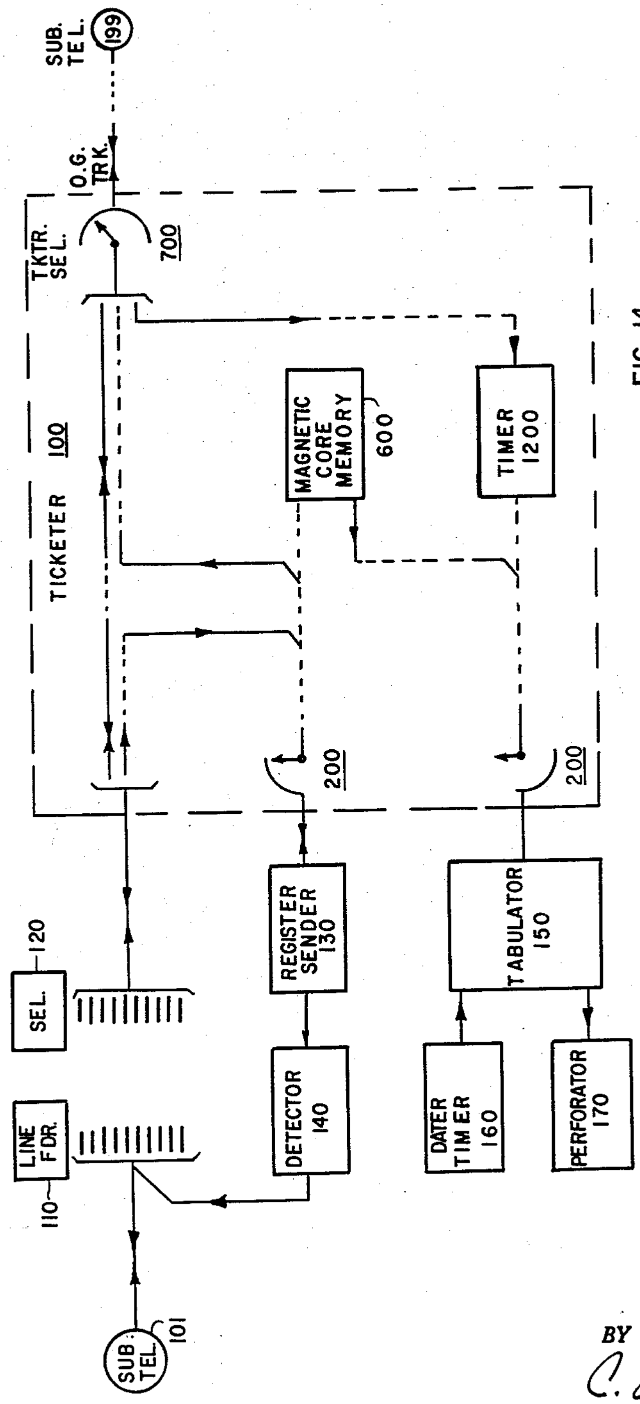

The above mentioned and other features of the present invention will be more clearly understood from a consideration of the following description read in connection with the drawings, in which:

FIG. 1 shows in block diagram form a portion of a toll telephone system employing a ticketer in accordance with the present invention.

FIGS. 2 through 13 inclusive taken in combination show in schematic form the circuit of a ticketer in accordance with the instant invention.

Figure 14:
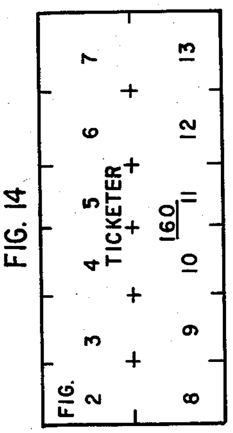
Figure 2:
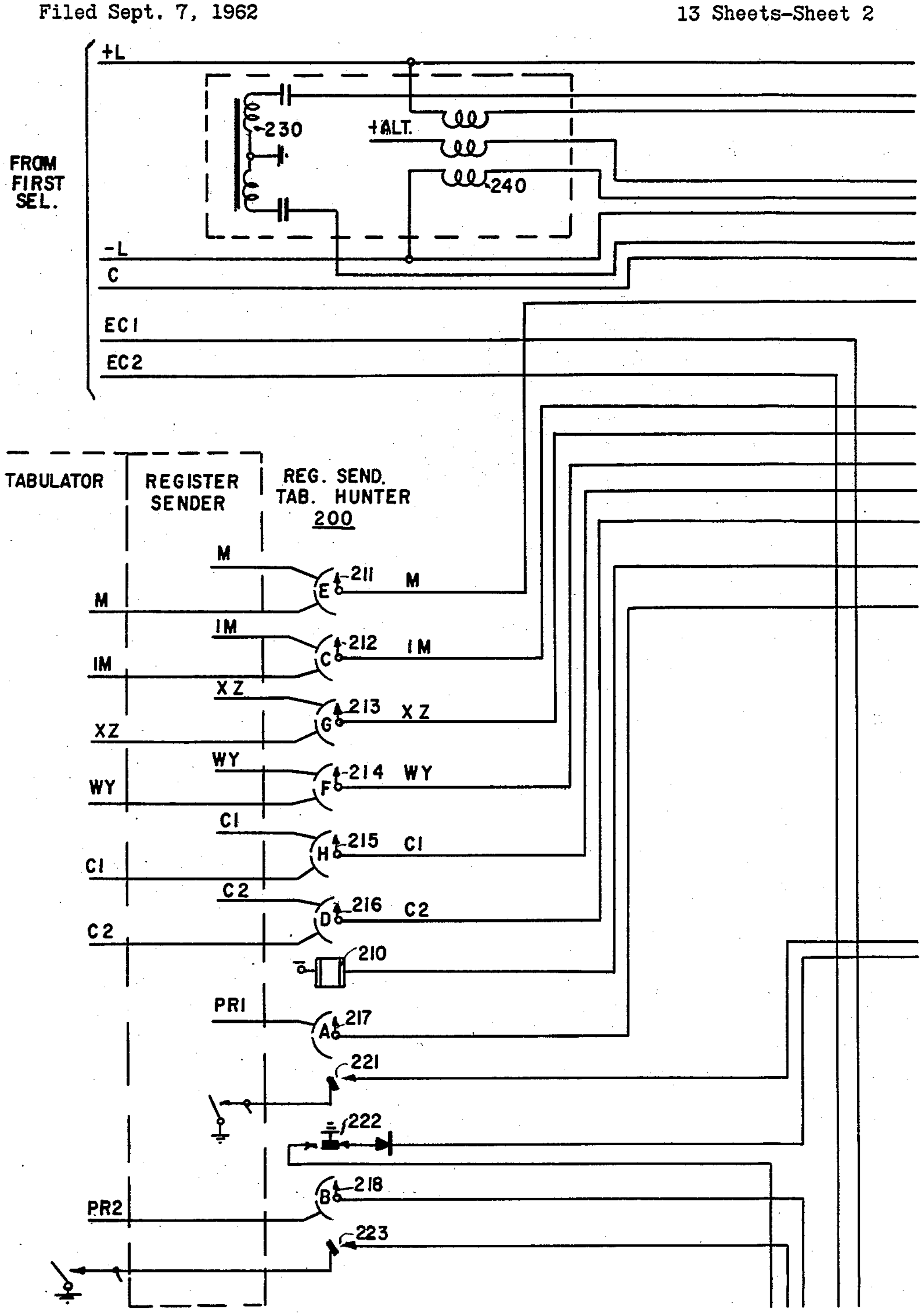
Figure 3:
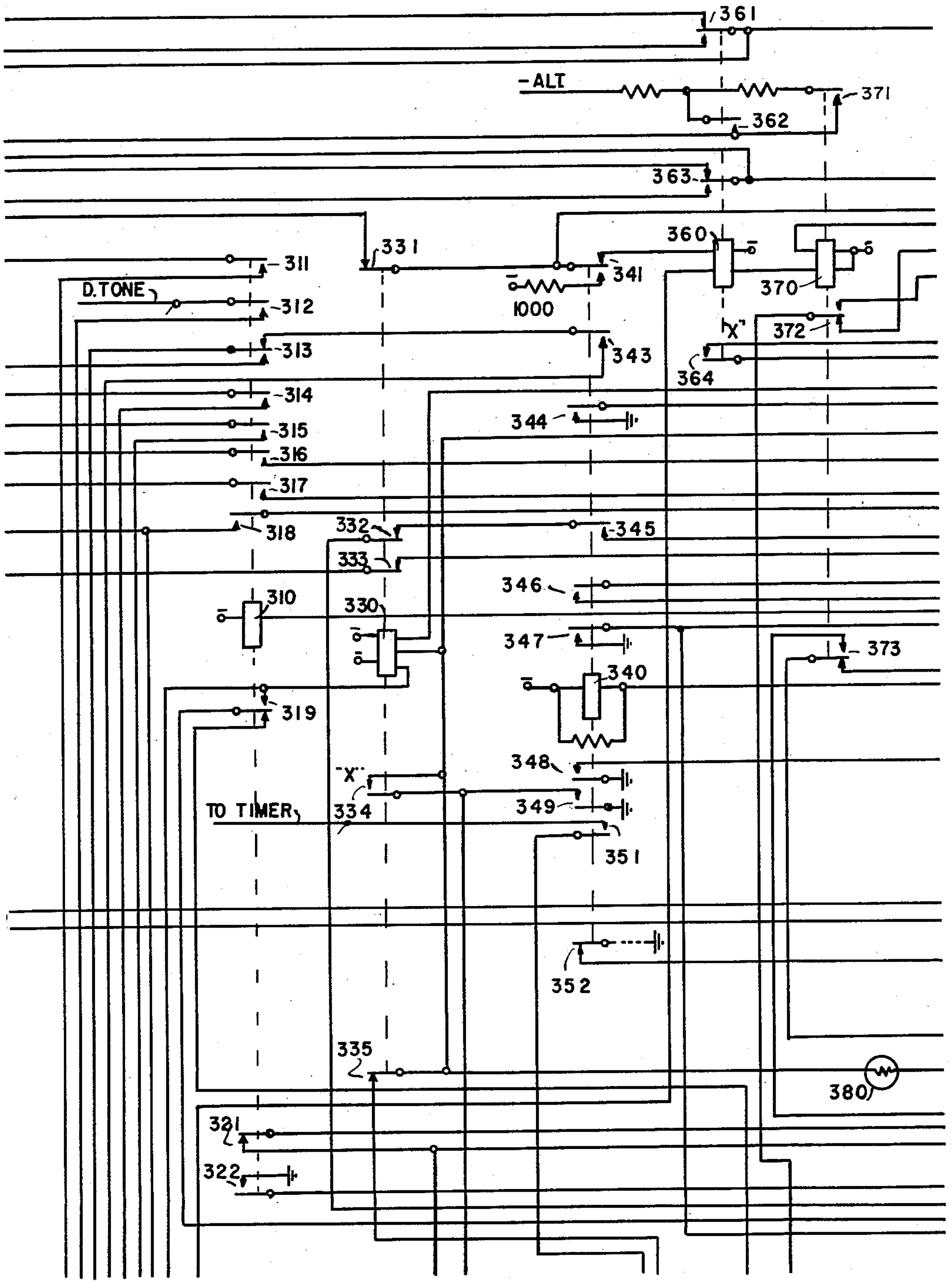
Figure 4:
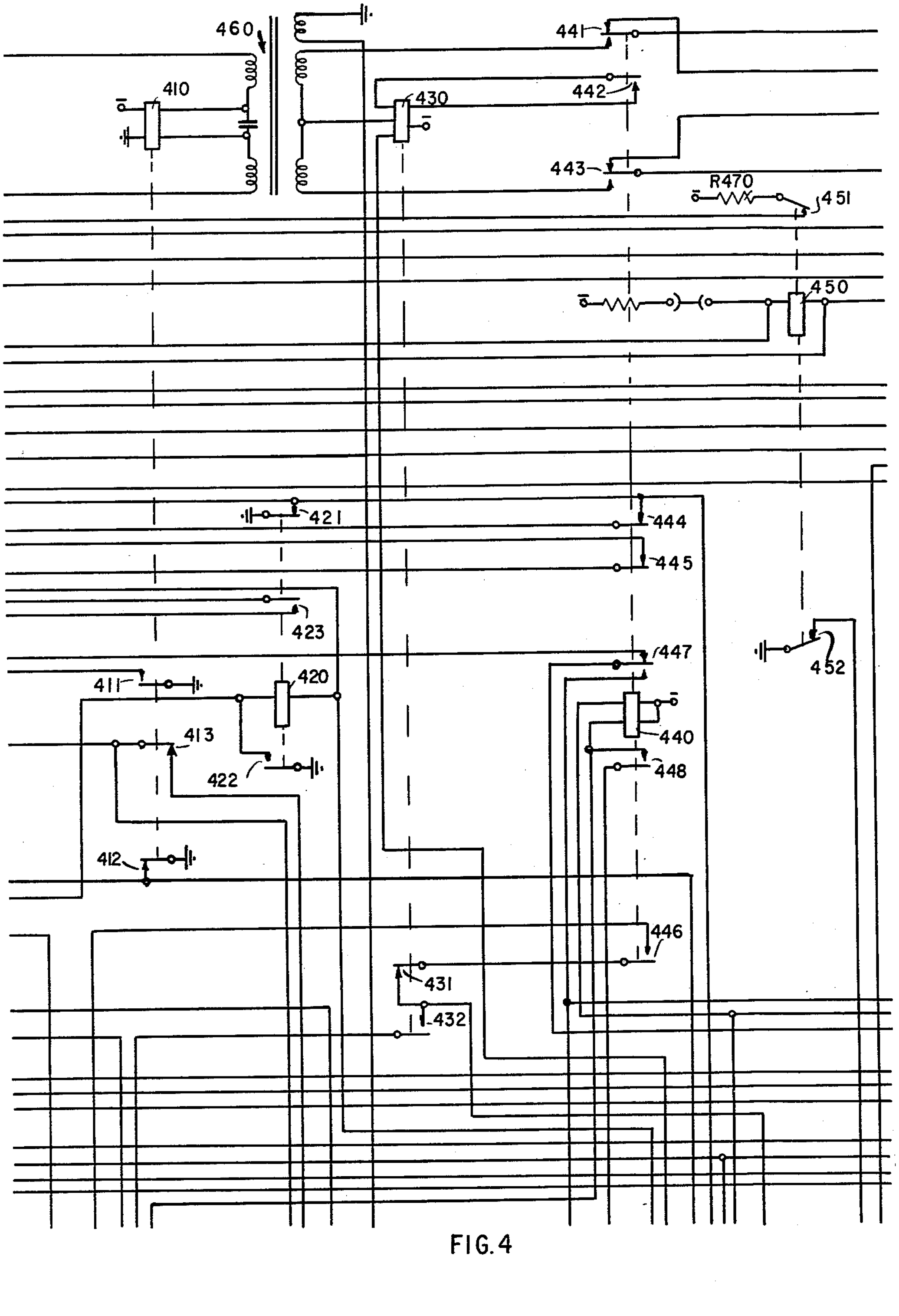
Figure 5:
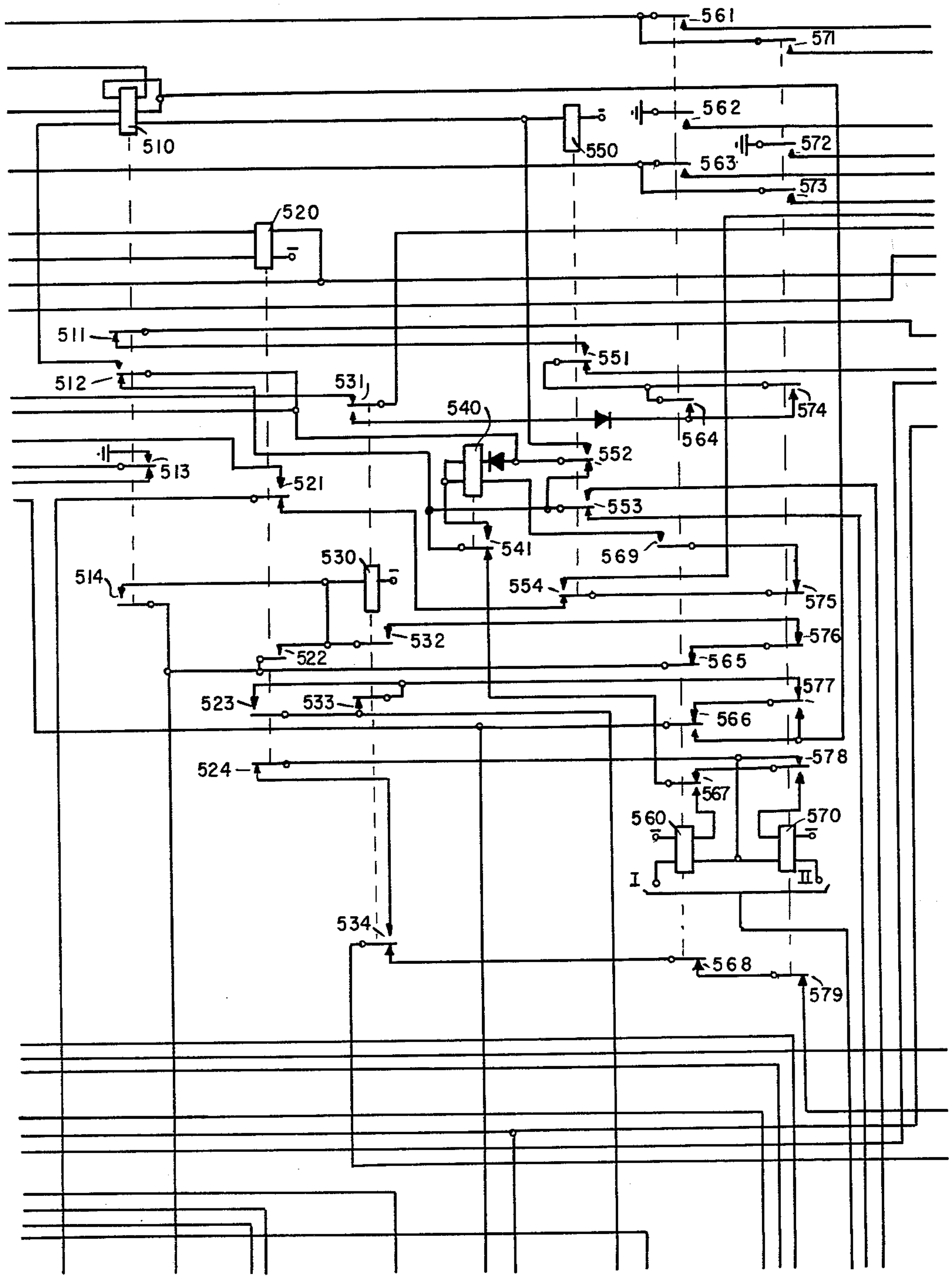
Figure 6:
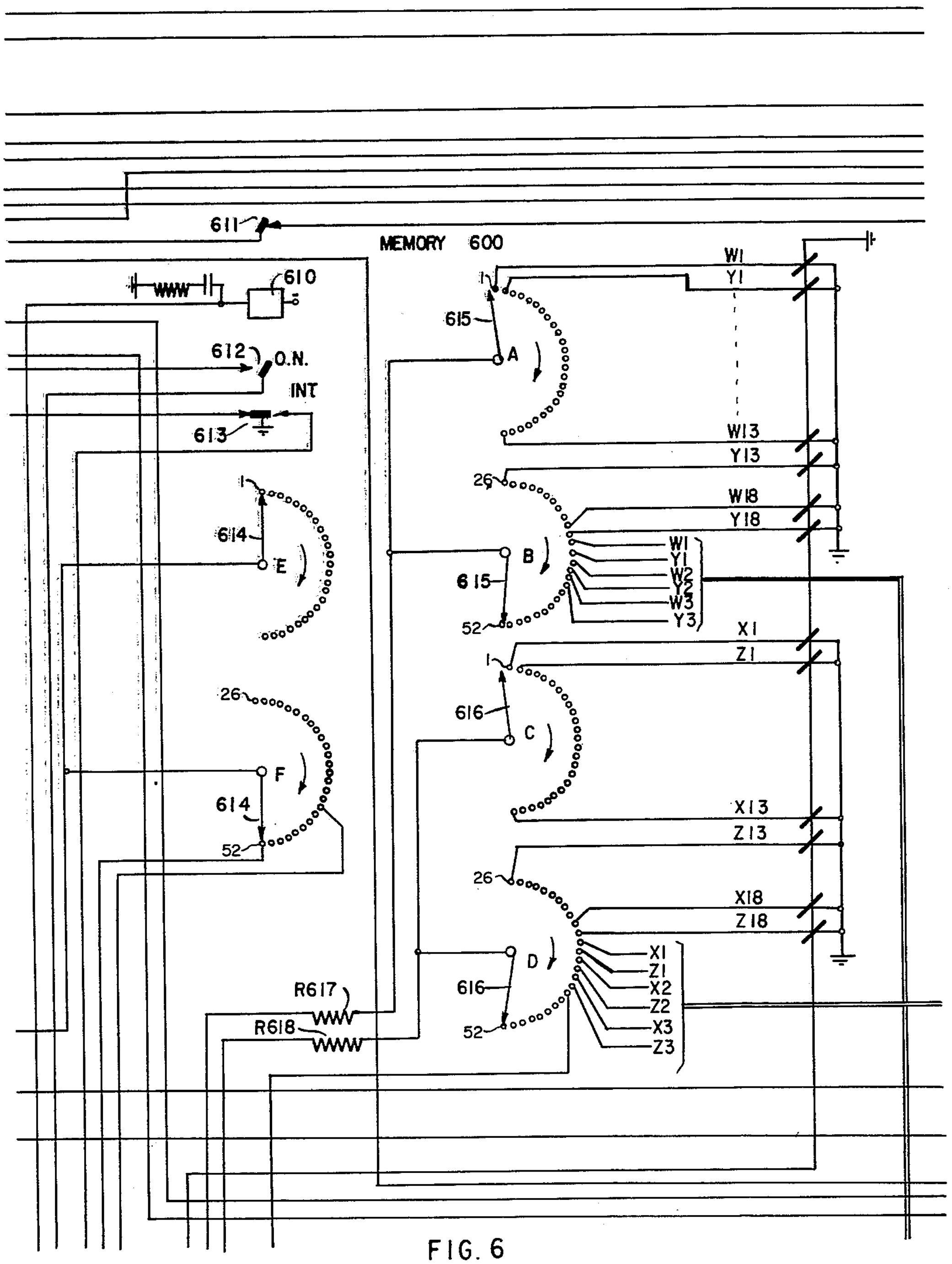
Figure 7:
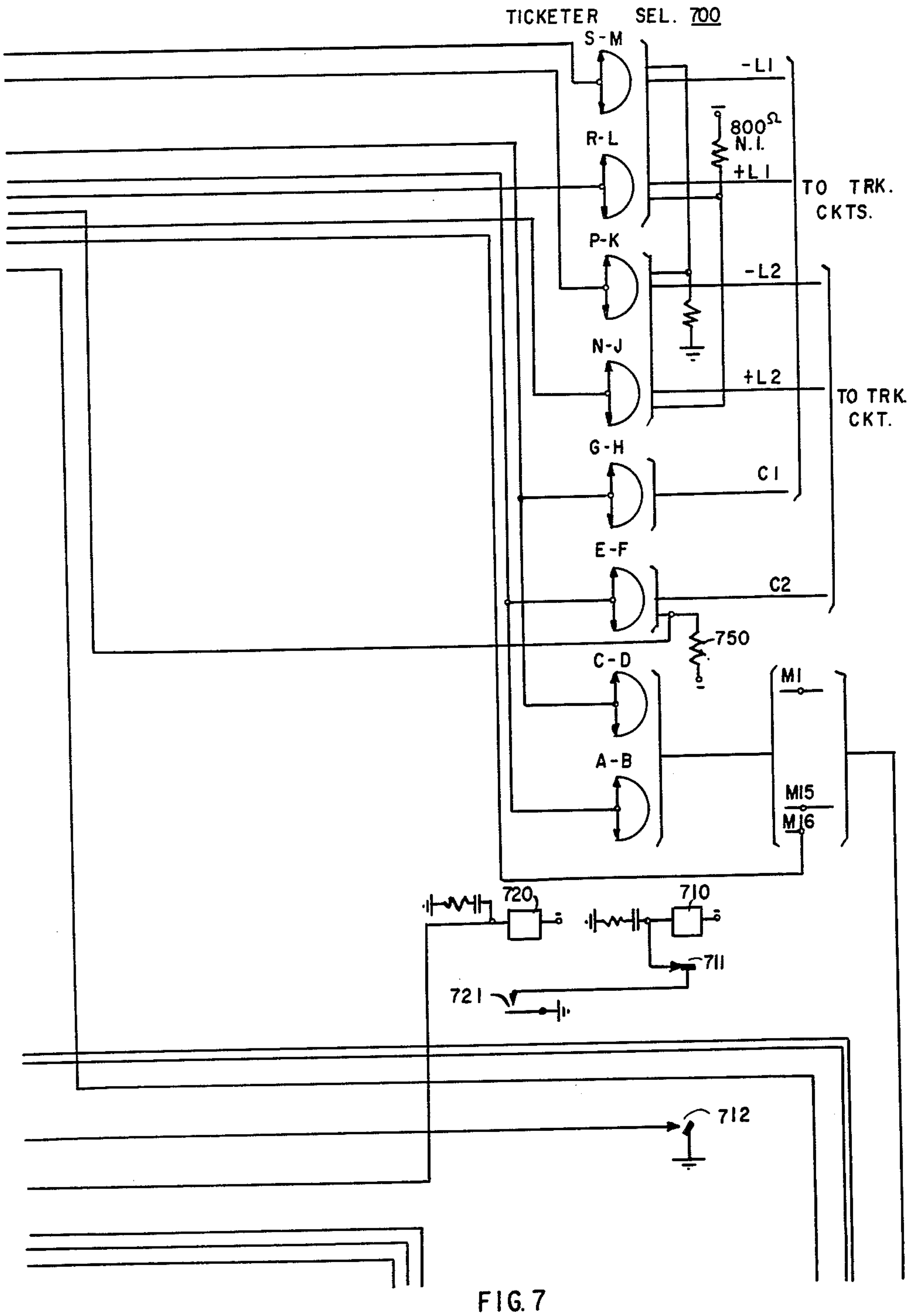
Figure 8:
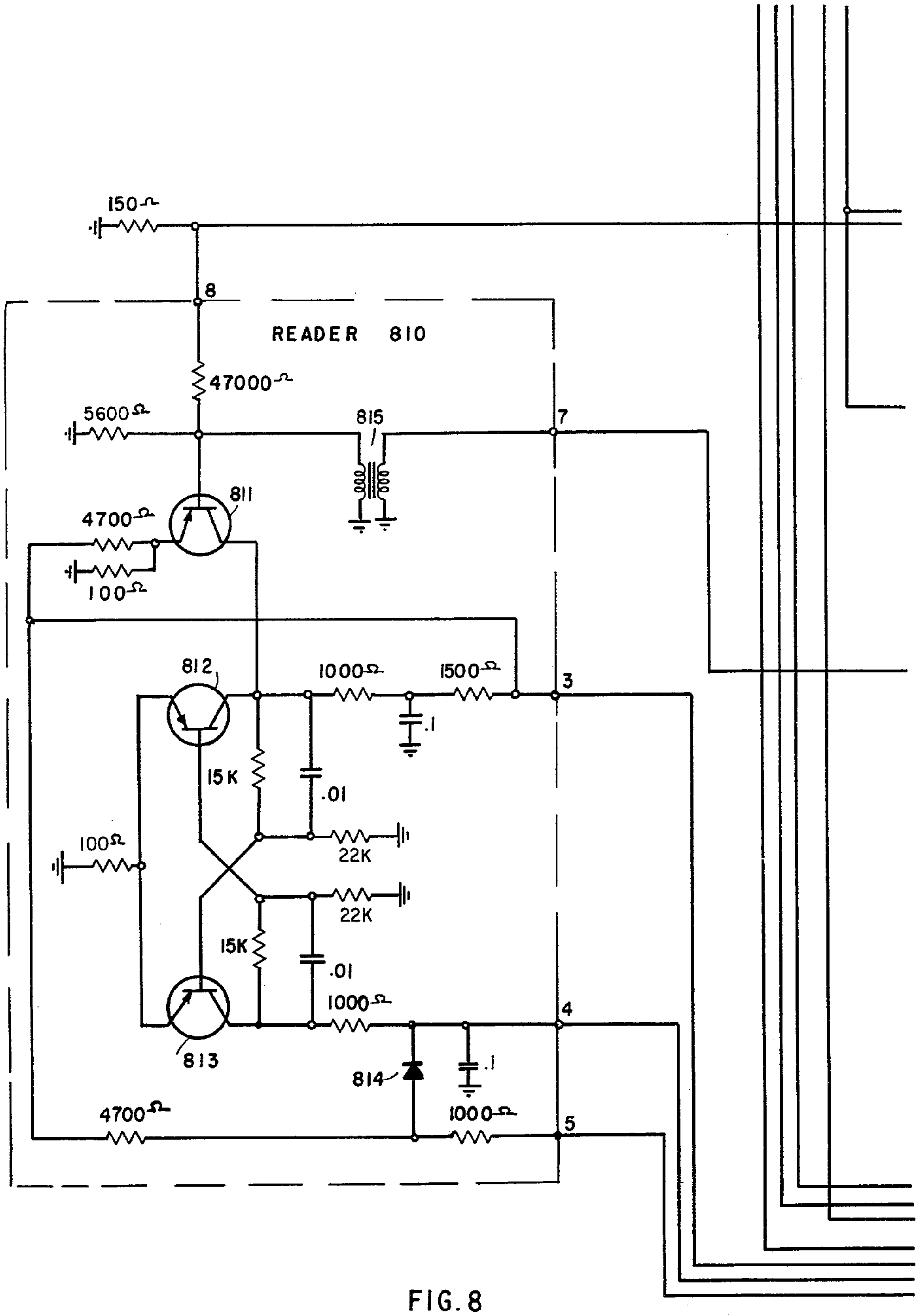
Figure 9:
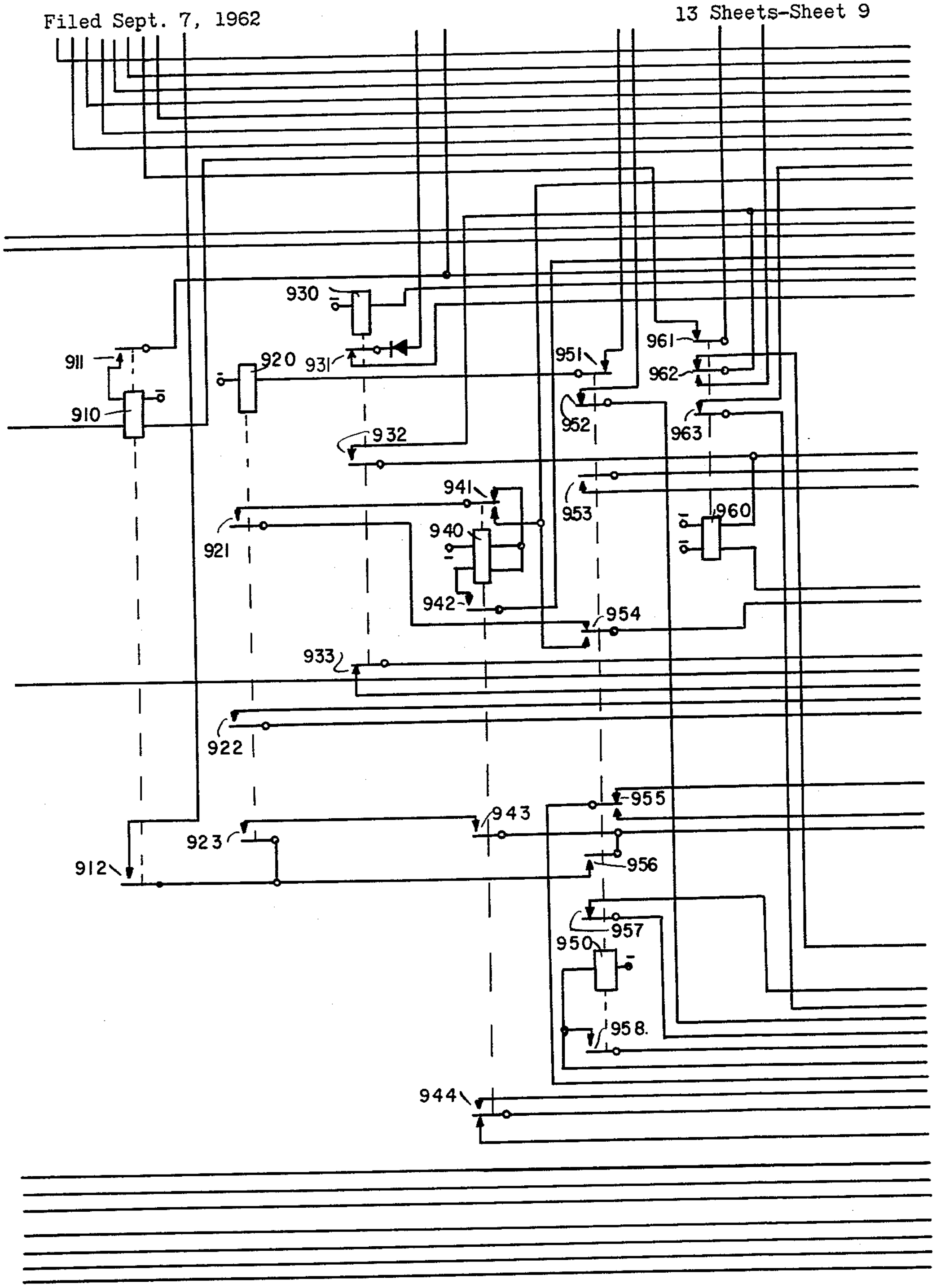
Figure 10:
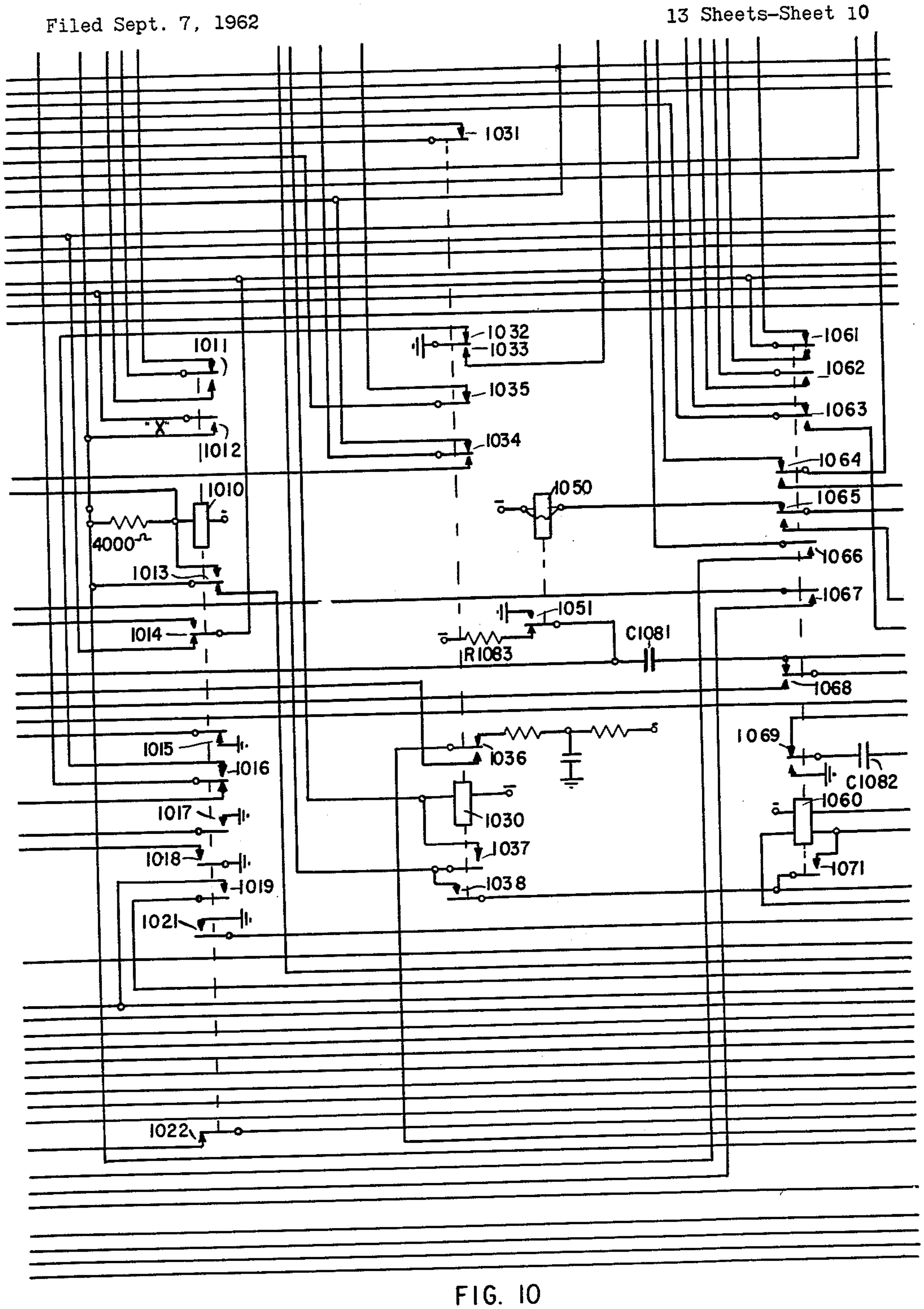
Figure 11:
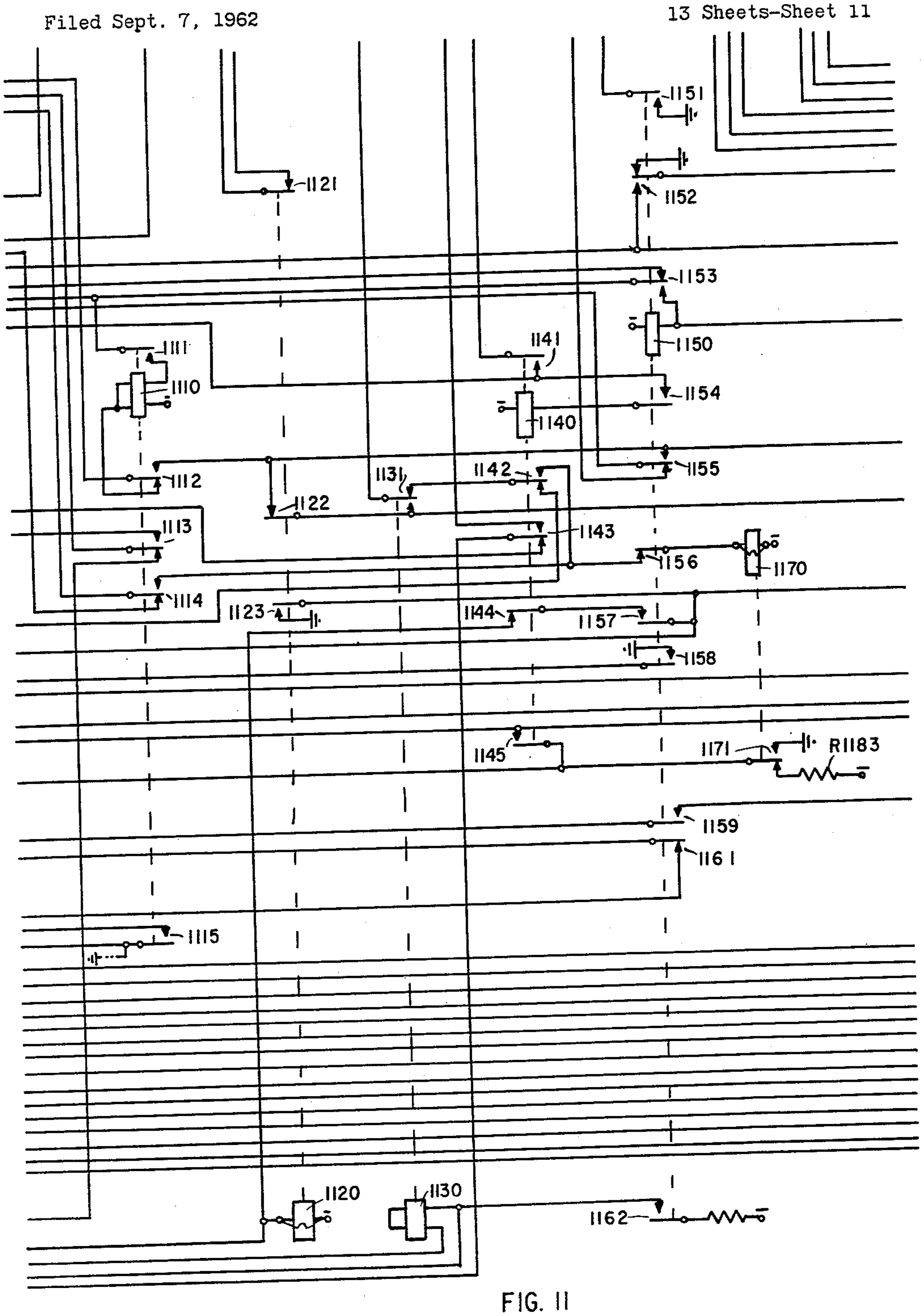
Figure 12:
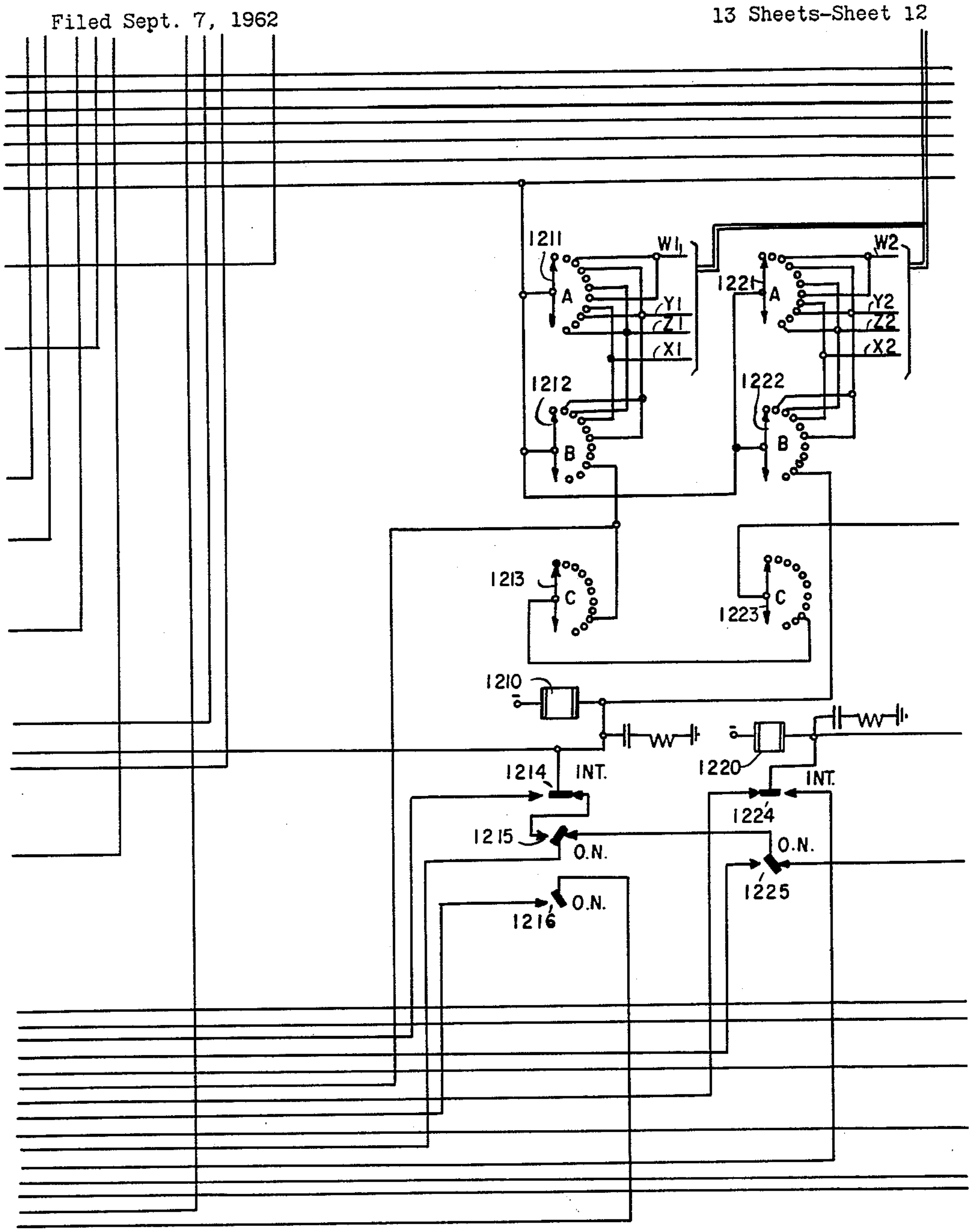
Figure 13:
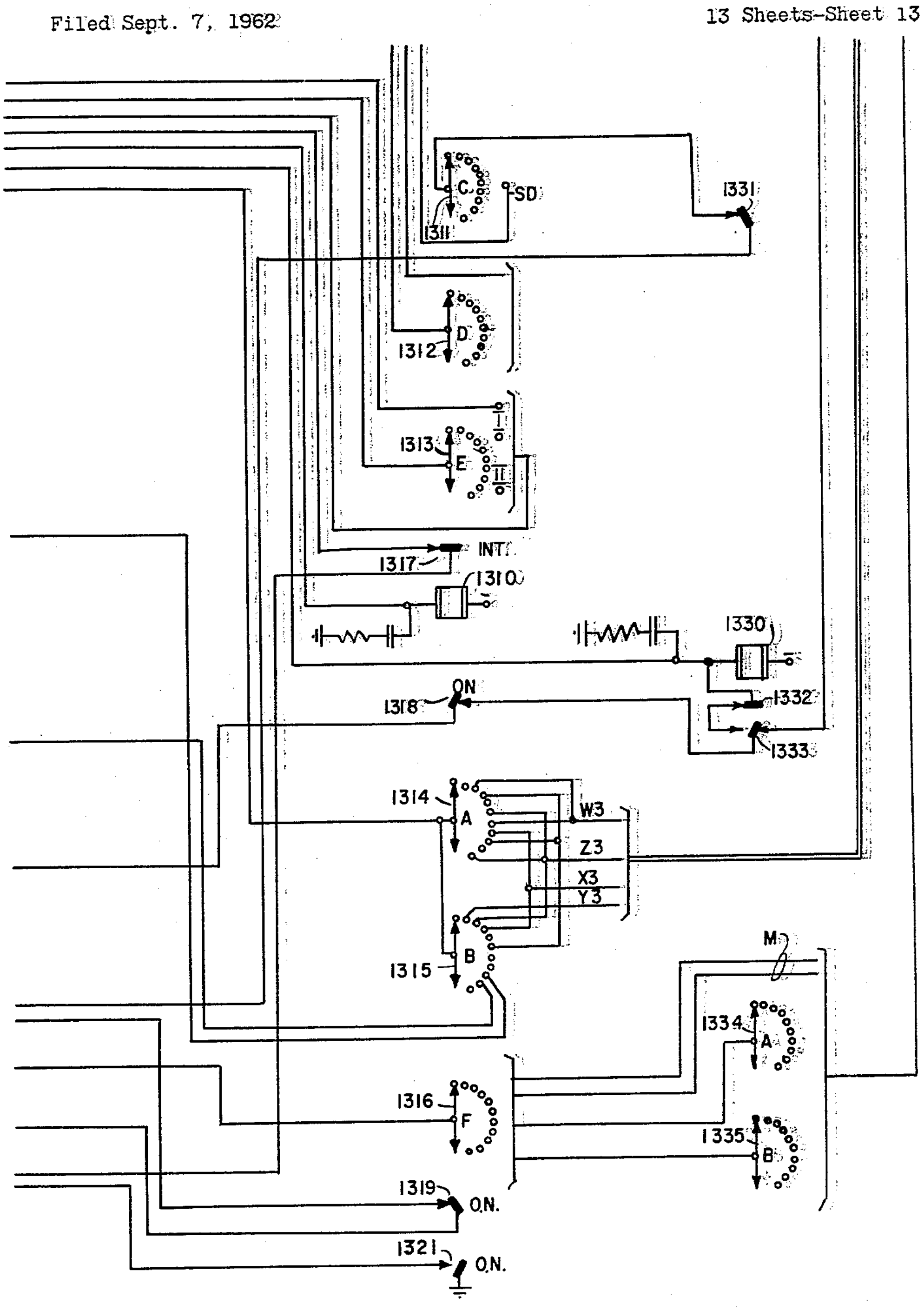

FIG. 14 shows the manner in which FIGS. 2 through 13 shall be placed for understanding of the present invention.

A general understanding of a telephone system that utilizes a ticketer according to the present invention may be had by reference to FIG. 1 and the following:

A subscriber at telephone 101 removes the handset from the hookswitch in the usual manner, linefinder 110 searches for the line connected to this telephone and on finding it returns dial tone. The subscriber then dials an access digit to place a direct dial toll call. The dial pulses will cause selector 120 to search for and seize ticketer 100. Ticketer 100 in turn operates its hunter switch 200 to seize an available register sender 130.

Register sender 130 in turn activates detector circuit 140. Detector circuit 140 causes pulses representative of the calling station directory number to be extended over the selector 120 to the ticketer 100 where they are further extended via the hunter switch 200 to the register sender 130.

Register sender 130 retransmits the calling station directory number in coded form over switch 200 to the magnetic core memory 600 where they are stored. The subscriber then dials the digits representative of the area code and the directory number of the called party. The dial pulses representative of the digits are extended over the previously noted path to register sender 130 where they are then retransmitted in two forms, in coded form to the magnetic core memory 600 where they are stored on a coded basis; and in digital form to the ticketer selector 700 where they are used to operate selector 700 to seize an appropriate outgoing trunk and subsequently operate additional switching equipment in the distant office. When the called party 199 in the distant office answers, supervision is returned to the ticketer 100 and extended to timer 1200 which starts timing the telephone conversation. Upon the return of answer supervision, ticketer 100 also effects the release of register sender 130.

Upon completion of the telephone call disconnect supervision is returned via selector 700 to the ticketer 100 causing hunter switch 200 to search for and seize tabulator 150 and also causing timer 1200 to stop timing the telephone call. Disconnect supervision also causes the outgoing selector 700 to be released in the outgoing trunk line, the ticketer 100 to be disconnected from the subscriber's line circuit.

The coded information stored in magnetic core memory 600 is now extended via the hunter switch 200 to tabulator 150 which also calls in additional information from data timer 160 and upon completion of transfer of all of the information representing the called and calling party directory numbers in magnetic core memory 600 to the tabulator, information concerning the duration of the call is transferred from timer 1200 to tabulator 150. Upon the completion of the transfer of the timing information ticketer 100 is released for further usage and the information concerning the telephone call that is now accumulated in tabulator 150 is extended to perforator 170 where it is stored for future usage.

A more detailed understanding of the ticketer circuit of the instant invention may be had by referring to FIGS. 2 through 13 inclusive arranged as shown in FIG. 14, wherein:

Seizure commences with the subscriber's first selector testing for battery through 1000 ohm resistance R470 connected to lead C by contact 451 of relay 450; through contact 331. Extension of the line +L and −L from the first selector operates relay 410 which in turn energizes relay 340, by extending ground via contacts 411.

Closure of the contacts of relay 340 initiates the search for a register sender. Relay contact 346 connects test relay 420 to wiper 217, the associated bank contacts on the same level as wiper 217 are connected to the seizure leads for the register senders. Contacts 345 complete an energizing circuit to the motor magnet 210. The interrupter springs 222 cause the operation of the relay 1120 which serves as the interrupter for the rotation. When a free register sender is reached battery is returned and relay 420 operates. The contacts 421 stop the first selector and relay 420 locks in series with the register sender over contact 422. The contacts 423 complete an energizing path for relay 310 which extends connections to leads M, IM, XZ, WY, C1 and C2 of the register sender; contacts 312 connect dial tone to the secondary of the coil 460 which extends it to the subscriber. The circuit is now ready to receive dial pulses.

At this time a few points should be noted: at the instant of seizure on the part of the subscriber's first selector, relay 360 is connected to the C lead in parallel with the test battery through resistance R470. Relay 360 operates at its "X" contacts 364 which cause the release of the guard relay 450 and the subsequent disconnection of R470 (1000 ohms) from the C lead. If the test by the first selector is not followed by closure of the loop (operation of relay 340). This prevents a subscriber's first selector from being improperly locked up on an unused selector. It should also be noted that at the moment of seizure relay 910 is connected to the EC1 lead until the release of the guard relay 450. If an impulse of battery indicative of users having remote charge computing equipment arrives over the line equipment, relay 910 operates and holds over its upper winding preparing a path for transmission of the charge impulses at a later time. Upon seizure of the selector the contact 351 connects relay 920 to the timer for measuring the waiting time until response. After 10 seconds relay 920 effects disconnection if there has not yet been a response.

*Identification of the Calling Party*

The register sender as soon as it is seized activates the detector circuit for identification of the calling party. The code impulses corresponding to the number and class of subscriber are extended to the first selector originating in the detector and being extended through the line circuit. They enter on leads EC1 and EC2 and exit on leads WY, XZ to the register sender where they are stored. Upon completion of the identification the register sender sends a ground impulse over the M lead which energizes two step relay 1110. The latter upon the termination of the impulse operates fully, locking to its contacts 1111.

The transfer contacts 1112, 1113 and 1114 switch leads M, WY and XZ, preparing the ticketer for reception of the data to be stored therein. The number and class of the calling party now comprise available information at the register sender; the latter transmits in the form of impulses to the relays 1050 and 1170 over leads WY and XZ respectively using the following code:

Digit 1—WX
Digit 2—WY
Digit 3—WZ
Digit 4—XY
Digit 5—XZ
Digit 6—YZ
Digit 7—W
Digit 8—X
Digit 9—Y
Digit 0—Z The relays 1050 and 1170 provide for registration in the ferrite cores in the following manner. For storage of each digit form cores are provided W, X, Y and Z; (1 to 18) the storage code is as indicated above. The cores are disposed on levels (A, B, C and D) of the rotary switch 610; each digit therefore occupies two steps and the corresponding information arrives in two steps: first the part relating to the elements WX, then the part relating to the element Y and Z of each digit, while appropriate implses on the M lead control the advance of the rotary switch 610.

Upon seizure of the circuit the cores are all in an identical state referred to as state "0" or an erased state. Registering a core consists in reversing its magnetic state by causing an appropriate pulse of current to traverse the wire which passes through it. These storage impulses or registration impulses are obtained through the discharge of two .4 microfarad capacitors (C1081 and C1082) connected to the levels A and B and C and D respectively of rotary switch 610. These capacitors are normally charged to 60 volts by the ground coming from the bank to battery taken through 27,000 ohm resistors R1083 and R1183. When one of the relays 1050 or 1170 operates, in the act of marking, its transfer contacts connect to ground the plate of the capacitor charged to −60 volts. The capacitor discharges in series with 50 ohm resistances (R617 or R618) and the current passes through the core. The positive peak of the current is such by its intensity and its direction that the magnetization of the core is reversed, and remains so after the capacitor is discharged. (The succeeding recharging current for the capacitor limited by the 27,000 ohms does not affect the state of the core.)

We will call state 1 the new state of the core or the storage condition.

The class and number of the calling party (four digits) are thus received in the memory circuit and stored on the first 8 steps of the rotary switch 610. The cores located on the succeeding steps will receive in a completely analogous manner digits as dialed by the calling party as they are accumulated in the register sender.

*Selection*

The calling party upon receiving dial tone may proceed with dialing. Dial impulses are repeated by relay 410 and extended to the register sender over lead IM. In addition at the start of the first impulse, contacts 413 energize relay 1030 which then holds through its own contacts 1037, contacts 1035 cut off dial tone.

The register sender stores the digits received and immediately initates their re-transmission.

Each digit dialed by the calling party exclusive of the initial "0" must come from the register sender, transmitted in two different forms: first as code impulses for registering on the cores of the memory circuit; and second as selection impulses for controlling the ticketer selector.

The called number is stored in the memory circuit in a manner the same as noted above for the number of the calling party. As soon as the digit is available in the register sender the latter transmits it for storage in the cores located in the memory circuit 600 of the ticketer sending a pair of impulses over lead M to cause advance of rotary switch 610 and sending the code impulses representative of the digits to be registered over wires WY and XZ.

Selection impulses for the various digits are transmitted by the register sender when two conditions are verified. First if the digit is ready for transmission from the register sender and second that battery through 750 ohms is present on lead C2 thus permitting operation of the ticketer selector. Relay 930 connected to lead C2 operates as soon as the register sender has received the first digit after the "0." This relay repeats the digit to control lead selection.

Contacts 931 and 933 are ineffective during the pulsing. Contacts 932 repeat the impulses of the first digit to motor magnet 1310 in parallel with the relay 960. This latter holds on the impulses while the switch moves to the step corresponding to the digit sent. The contacts 962 cause relay 520 to operate. Contacts 522 complete an operating path to relay 530 which holds then to its own contact 532.

At termination of the first digit several cases may arise. The first digit transmitted may call for initiation of immediate hunting for a specific toll trunk or group of lines of selectors; in such a case at termination of a digit relay 370 releases and then 520 releases. Relay 930 is disconnected from lead C2 coming from the register sender; the energizing circuit is thus closed to ground through contacts 344, contact 512, contact 541, contacts 567, contact 578, contacts 524 and contacts 534 to motor magnet 720 and thence to battery. This operation of motor magnet B4 initiates operation of the switch while test relay in the trunk circuit is connected to the test circuit via the following path: from ground through contacts 344 to the associated rectifier, the winding of relay 540, contacts 569, 575, 554, 521, 963, wiper 1316, lead M multiples to the levels A–B or C–D, the banks of the ticketer selector 700 corresponding points to be reached, over the wipers of the levels E–F and G–H, to test battery on the bank. The wiper 1313 of the level E of the switch 1310 finds itself already stopped on the leads I or II and accordingly the selector hunts the first 100 level or the second 100 level.

The test circuit is operated when the first trunk is found idle in the marked group. The relay 540 operates at high speed and stops the selector by inserting the relay 560 or 570 in the switch 1310 locking circuit. The trunk is seized first through the 7 ohm winding of the relay 540 and immediately after direct ground is placed on the contacts 562 or 572 to operate relay 560 or 570. Conversation leads L1 and L2 are extended. The contacts 565 of relay 560 or 576 of relay 570 deenergize relay 530 which releases after a short delay. Lead C2 coming from the register sender is extended to the trunk over the leads +L and —L in parallel. The impulses are inserted at the center point of the line by the windings of the relay 510 which are connected in opposition and consequently becomes non-inductive with respect to the impulse currents. When the line repeater in the selector gives appropriate supervision, the register sender will send the remaining digits which pass through the selector without any repetition.

If the first digit calls for the arrival of a second digit before starting the hunting, the lead SD is connected to the level C of the switch 1310 on the step corresponding to the first digit. Consequently on the release of relay 960 after the first train of impulses relay 520 does not release but remains operated over the upper winding energized in series with relay 370. Relay 370 operates and at the transfer contacts 373 switches contacts 932 from the switch 1310 to the switch 1330. Contacts 524 hold the energizing circuit of the motor magnet open. Contacts 523 place supervisory battery on lead C2 to the register sender. The register sender as soon as it receives the second digit transmits it to the selector. The second digit pulses the second switch 1330. During the impulses relay 960 again operates. Relays 520 and 370 are operated through contacts 962 and 372. At the termination of the digit, relay 960 releases as do relays 520 and 370.

Hunting and testing proceed in a manner similar to that previously seen keeping in mind that now the switching circuit extends to the bank of the switch 1330.

If the received digit corresponds to a non-existent group or a restricted group the ground is extended back from the step reached in the bank of the switch. During the interval between the release of relays 960 and 520 it is extended to relay 330 over the following circuit: from ground on the bank A of the switch to contacts 963, 521, to the center winding of relay 330 to battery. Relay 330 operates locking over its contacts 334 and causes release of the circuit. Actually the opening of the incoming lead C causes disabling of the line circuit opening the +L and —L leads freeing the selector. The subscriber then receives busy tone from the line circuit.

If the ticketer selector fails to switch through to a group an alternate routing through a tandem office may be required. For other groups failure of the ticketer selector may indicate abandoning of the call and returning of busy tone to the calling party. In any case when the marked group have been passed over the selector stops on the last step of the group testing for battery through 800 ohms of non-inductive resistance which is connected thereto.

If the trunk group does not provide for lockup in case of failure to switch after the selector stops; relay 560 or 570 operates and 530 will be deenergized. After release of relay 530 relay 330 is connected at its upper winding to ground coming from the bank. Upon operation of 330 the C lead incoming to the selector is opened, the selector is freed while the line circuit of the calling party is disabled returning busy tone to the calling party.

Assume now that indication of alternate routing is given for the marked group. Ground and battery through 500 ohms are connected to the bank. When the selector stops on that step and extends the line wires by way of relays 560 or 570 the above mentioned polarities energize relay 510 over its two windings in series. The contacts 513 then extend ground to the register sender over lead C1 which will now repeat the digit already transmitted upon return of the supervisory signal at which time contacts 512 provide a hold for the relay over the lower winding of 510 energizing 550 which holds and short circuits relay 510. Contacts 514 prevent the release of relay 530. Upon the operation of relay 530 and 550 either relay 560 or 570 is deenergized causing the deenergization of relay 510 by opening the line loop. Upon release of 510 the selector starts hunting again and the relay contacts 554 cut off all the previous existing markings and mark only the tandem office connections.

When one of the adapters of this group is reached the line leads are extended upon receipt of the supervisory signal from the tandem office. The register sender will now repeat the stored digits to the tandem office.

At the completion of selection of the path to the toll office or tandem office ground is returned to the ticketer selector at the center point of the line wires in turn is extended over lead C2 to the register sender where it is interpreted and retransmitted to the first selector in the form of a ground placed on lead C1. Relay 430 operates over its lower winding, contacts 432 operate to energize relay 440 which will then hold to its own contacts 448. Transfer contacts 441 and 442 of relay 440 extend the line loop disconnecting relay 510 and connecting the center winding of relay 430 which will lock to the ground returned indicating completion of hunting.

Contacts 447 will cause switch 1310 to return to its home position for use during the conversation period for measuring the duration of the conversation.

Release of the register sender is controlled by the register sender itself which opens lead PR1. The relays 420 and 310 then release in the ticketer. The magnet 210 receives an impulse on opening of contacts 318 which advances it to the next step. A circuit will remain thus while awaiting response timing the call as indicated previously.

When the called party responds ground which has been returned from the selector to the center point of the line is removed and relay 430 releases. Contacts 431 then energize relay 1010 in series with 4000 ohms causing only its X contacts 1012 to close. Relay 950 is energized over contacts 1013 and off normal springs 1319. Contact 953 short circuits the 4000 ohms and causes complete operation of relay 1010.

Switch 1210 which was counting the waiting time until a response is returned, homes upon closure of relay contacts 1017 and 955. As soon as switch 1210 is at rest relay 950 is deenergized by opening of the off normal contacts 1216. Switch 1310 consequently received a ground pulse from the contacts 954. Marker 1210 is used together with markers 1220 and 1310 for counting in tens of seconds the duration of conversation and therefore receives an immediate impulse upon the response which is counted as a timing impulse. The first ten second impulse which arrives must therefore be nullified. This is accomplished by causing its absorption by relay 940 after which the impulse is repeated by 920 are passed to the timing marker. The three rotary switches 1210, 1220 and 1330 count respectively to hundreds, tens and units of the ten second impulses without the aid of any other relays. Each ten steps of switch 1310 cause switch 1220 to advance by one step, the latter together with switch 1210 steps another division by ten. Each of the three switches marks on its own bank levels A and B, the digit corresponding to the step on which its wipers are extending. The maximum capacity of the three switches is 999 impulses (equivalent to about 3 hours), after which disconnection is effected.

At the completion of the conversation the selector 700 is released hanging up with the calling party or the called party. In the latter case upon the hanging up ground pulses reappear at the center point of the line loop, relay 430 operates and holds on the pulses, connecting the center windings of relay 330 in series with a thermister 380. When the thermister 380 has been heated which occurs in about 30 seconds relay 330 operates, opening the wires to lead C and causes the disabling of the line circuit to the calling party with the consequent opening of the line loop. In such case relay 410 releases and subsequently relay 340.

Upon the opening of contacts 344 the connection holding relay 560 or 570 is deenergized and the selector returns to rest while the memory circuit prepares to transfer the data to a tabulator. Actually upon the opening of contact 348 the winding of relay 1030 finds itself connected in series with the lower winding of relay 1060 through contacts 1115 and 1021. Relay 1060 operates and at contacts 1061 energizes relay 1150 (in parallel with relay 440 already operated) and starts looking for a tabulator. Contacts 1062 extend an energizing circuit to motor magnet 210 while contacts 1066 connect relay 420 to the test lead PR2 leading to the tabulator. Relay 1120 acts as an interrupter for the rotation.

When a free tabulator is found relay 420 operates, at contacts 421 it stops rotation and at contacts 422 holds in series with the seizure relay of the tabulator. At contacts 423 it energizes relay 310 which extends the leads to the tabulator (if at the time of the search all tabulators are busy ground on lead DT causes operation of relay 960 and stops hunting while the busy condition lasts after which hunting again proceeds to seize a tabulator in the usual manner).

Transfer of data from magnetic cores to the relays of the tabulator now begins.

Each of the magnetic cores is in a magnetic state of either "0" or "1," that is it is either erased or registered.

The cores as noted are each traversed by two wires an individual wire connected to ground after having passed through the core and a common or reading wire which passes through all of them and is extended to the input of a transistor reader. This reader 810 controls its high speed relay 1130 which repeats the data stored in the cores to the relay memories of the tabulator.

The cores are rapidly scanned one by one by sending a negative impulse over the individual wire passing through each core. In the cores previously marked there is a new reversal magnetic state which causes an impulse of voltage to appear on the read wire connected to reader 810.

The reader circuit 810 consists of a conventional bistable multivibrator employing transistors 812 and 813, a high speed relay 1130 is placed in the collector circuit of transistor 813 and characterizes the two conditions of the multivibrator.

Control of the multivibrator is effected through the collectors on the one hand by means of a third amplifying transistor 811 and on the other hand by means of a positive impulse passed through diode 814.

When the circuit is seized for the reading of a previously marked magnetic core, the relay in the tabulator operates extending ground to activate the multivibrator which positions itself with the high speed relay 1130 operated (transistor 813 conducting). To obtain this result the impedance of relay 1130 which makes the multivibrator asymmetrical would be sufficient but to guard against possible chattering of the contacts of the tabulator relay which might cause triggering of the flip flop, a ground is placed on the terminal 5 coming from the normal position of the registering rotary switch placed in the control circuit of the tabulator via lead C2. To the bank of this switch are connected the relays to which the information stored in the magnetic cores is to be transferred. Operation of high speed relay 1130 causes the advance in a synchronized manner of the above-mentioned rotary switch and the rotary switch 610 to the bank of which are connected the magnetic memory cores.

On the steps associated with previously marked cores only, an impulse is induced into the read wire which is in series with the primary of the input transformer of the amplifier. If the directions of the windings are appropriate with respect to the read wire, a negative impulse is obtained at the base of transistor 811 which being rendered conductive furnishes a positive impulse to the collector of transistor 812 and consequently to the base of transistor 813.

The multivibrator then reverses its position and relay 1130 releases (transistor 812 is conductive). Relay 1130 on releasing stops the rotary switch on that step for an instant, transfers the information to the relay which is connected to such step on the registering rotary switch in the tabulator.

This relay upon operating returns a control ground to terminal 5 of the reader 810 causing a new reversal of the flip-flop and the subsequent reoperation of the relay 1130 enabling the reading of the cores to continue.

The reader 810 includes the input transformer 815 which has a turns ratio of 1 to 30. With impulses of approximately 100 millivolts on the primary winding there are about 3 volts available at the base of transistor 811. Since transistor 811 is responsive only to negative impulses the resistance of 56,000 ohms at the base of transistor 811 constitutes a closure of the secondary for the positive impulse. Without this closure the secondary would be open for the positive impulses which consequently would be followed by dangerous negative spikes. In this case the ends of both the windings are connected to ground. The emitter of transistor 811 is connected to a voltage divider comprised of resistances of 220 and 3900 ohms to permit attenuation of the sensitivity of the amplifier. In this way only voltages above the emitter voltage applied to the base are effective. Since the relay 1130 is mounted with the other relays the terminal 4 reaches it over a connection which may be quite long whereby it may collect in its passage disturbances of various kinds which would be conveyed to the collector of transistor 813. Consequently the .1 microfarad capacitor with the 1000 ohm resistance constitute a filter for protecting the collector against external disturbances. To maintain the symmetry of this filter it is placed on both of the transistors. The diode 814 has a double purpose, first for protecting transistor 813 against relay over voltages but since it also constitutes a delay at the latter a 4700 ohm resistance is placed in series which reduces the shunting effect of the rectifier. A second purpose is that of protecting the collector of transistor 813 against a possible direct battery of −60 volts placed erroneously on terminal 5. This is of course a wire coming from the bank of the rotary switch mounted on another unit. The 47,000 ohm resistance which leads to the terminal 8 and which is in series with the secondary of the input transformer serves for the retrieval in the same manner of the information relative to the duration of conversation.

In this case the magnetic cores are not utilized and consequently a negative discharge impulse from the .4 microfarad capacitors (C1081 and C1082) are taken directly to terminal 8 and thus to the base of transistor 811. The resistance in question serves to keep the current within the limits required for correct operation. In this case it is supported by a second resistance of 56,000 ohms in parallel to ground.

When relay 1150 of the selector operates at the start of hunting for a tabulator contacts 1162 activate the multivibrator which positions itself with relay 1130 operated. The core reading circuit is started as soon as relay 310 is operated extending leads from the ticketer to the tabulator. The contacts 322 extend an energizing path to relay 930, motor magnet 610, the motor magnet in the tabulator in parallel with one another over a circuit extending from ground through contacts 322, 1131, 1122, motor magnet 610, relay 930, and the magnet in the tabulator through contacts 1112, 311. Contacts 613 and off normal springs via lead IM, in the tabulator are in parallel with each other energizing relay 1120 over the following circuit: ground, through contacts 613, 1157, 1144 to the winding of relay 1120 to battery. Ground is also extended to lead M of the tabulator timer via contacts 1112. Ground is returned over lead IM through contacts 313, 1063, 1157 and 1144 to the winding of relay 1120 and then to battery. Relay 1120 locks up over its contacts 1123 and at contacts 1122 opens the energizing circuit to the tabulator motor magnet and motor magnet 610 as well as relay 330. The two rotary switches move to step one, the off normal contacts 612 operate, relay 930 releases, energizing relay 1140 over the following circuit: extending from ground, through contacts 322, 1131, 612, 931, 1154, the winding of relay 1140 to battery. Upon operation of relay 1140 contacts 1144 open, deenergizing relay 1120. Upon release of relay 1120 the circuit for energizing the two motor magnets and the relay 930 is reestablished. The above described cycle is repeated successively for each cycle as the two rotary switches in the ticketer and in the tabulator step forward in a synchronized manner. During the pause in each step the two .4 microfarad capacitors C1081 and C1082 are connected to the levels A–B and C–D respectively and are discharged over the individual leads which pass through the cores connected at each step. It should be noted that the two discharge pulses are released at two successive instants. The first on the closure of contacts 933 and the second on the closure of contacts 1145.

If neither of the two cores are marked in such case read pulses sent through the cores are without effect on the multivibrator, and the operation of the circuits is completed without interruption and the rotary switches move to the next step. If the cores however are marked the cycle which determines advance of the rotary switches is subject to a delay during the reading of the core to allow time for the corresponding relays to operate. If it is assumed that both cores of a step are marked, on the release of relay 930 reading of the cores on level A–B takes place, immediate reversal of multivibrator and release of relay 1130 follow. In this way operation of 1140 is prevented and ground is extended then over wire WY. This ground is extended to the tabulator relay corresponding to the core being read. This relay operates and at one of its contacts sends back supervisory ground over lead C1 which causes re-establishment of the initial state of the multivibrator and reoperation of relay 1130. Relay 1140 can now operate reading the second core with a new operation of the multivibrator, release of relay 1130, marking of wire XZ to the tabulator, return of the control ground over lead C2, establishment of the position of the multivibrator and relay 1130 and resumption of the advance of the rotary switches.

All of the steps to which the cores are connected having been passed over rotary switch 610 steps to find the data relating to the duration of the conversation. There are direct connections between the bank of the reading rotary switch 610 and the reader 810 extended to the banks of the timing switches 1210, 1220 and 1310. On these steps reading of the marked wires is effected by utilizing the same discharging impulse from the reading capacitors which are conducted to the multivibrator over the following circuit. From the bank of rotary switch 610 via scanning wires W1, X1 etc. the bank of marker contacts 1152, to terminal 8 of reader 810.

The system for controlling the operation of the corresponding relay is identical with that used for the cores. Forty-two steps of the rotary switch 610 having then passed over, in this manner the stored data is now registered on the relays of the tabulator. When the 43rd step is reached relay 1060 is deenergized over the circuit extending from ground, through contacts 1033, 1061, wiper 614 of rotary switch 610, contacts 1159 to the upper winding of relay 1060 and then to battery. Upon release of relay 1060 the hold on relay 1030 is open with the result it will release the circuit, return the rotary switch to normal and re-establish the circuit which makes the ticketer selector free for re-use.

For any of the marked cores or leads when control ground is not received back from the tabulator the two circuits are blocked at the position reached. Since the ticketer selector permits only a limited time for completion of the operation of transfer of data an alarm signal permits identifying the locked circuit and correcting the difficulty without loss of data.

What is claimed is:

1. In an automatic toll ticketing telephone system, a calling station and a called station each having a directory number, means for establishing a circuit connection to permit a telephone conversation between said stations, for recording said directory numbers, and for recording the duration of said conversation, including first switching means, a trunk circuit, a register sender, a tabulator, and a ticketer including: individual circuit connections to said first switching means, to said trunk circuit, to said register sender and to said tabulator; a memory circuit comprising a plurality of magnetic cores, and connecting means including a plurality of individual circuit connections to each of said cores and a plurality of circuit connections to said register sender, operated in response to a marking signal received from said register sender, to complete a circuit path between said register sender and selected ones of said magnetic cores whereby marking potentials representative of said directory numbers are transmitted from said register sender to selected ones of said magnetic cores to reverse the magnetic flux of said selected cores to mark said selected cores; a timer circuit operated in response to an answer signal returned from said trunk circuit to start timing said call, and further operated in response to a disconnect signal returned from said trunk to stop timing of said call; and readout means comprising a reader circuit including circuit connections to said memory circuit and to said tabulator, second switching means connected to said reader circuit, to said connecting means, and to said tabulator, operated in response to said reader circuit to operate said connecting means to connect a readout potential to each of said magnetic cores, a readout wire extending through said cores connected to said reader circuit, extending in response to the connection of said readout potential to one of said marked cores, a readout signal to said reader circuit, said reader circuit rendered inoperative in response to said readout signal, said second switching means operated in response to said reader circuit being rendered inoperative to transmit a marking signal to said tabulator indicative of the directory number information stored in said marked memory cores; said reader circuit further including circuit connections to said timing means, said second switching means further operated in response to said reader circuit being operated in response to a signal transmitted from said tabulator after transmission of all said directory number information to said tabulator, to connect said connecting means to said timing means and to connect a readout potential to said timing means via said connecting means, said timing means extending said readout potential to said reader circuit in accordance with marked circuit paths representative of the duration of said call, said reader circuit rendered inoperative in response to extension of said readout potential, said switching means further operated in response to said reader circuit being rendered inoperative to transmit a marking signal to said tabulator indicative of the timing information recorded in said timer.

2. A reader circuit as claimed in claim 1 comprising a transistorized bistable multivibrator including circuit connections to said connecting means and to said tabulator; a relay connected to said multivibrator and including circuit connections to said connecting means and to said tabulator operated in response to said multivibrator being in its first stable state to operate the connecting means to sequentially connect the read out potential to each of said magnetic cores; a read out wire extending through said cores and extending to said multivibrator operated in response to the connection of said read out potential to one of said marked cores to extend a read out signal to said multivibrator, said multivibrator operated to a second stable state in response to said read out signal to release said relay, said relay upon release extending to said tabulator a marking signal indicative of the directory number information stored in said marked core.

3. A reader circuit as claimed in claim 1 consisting of a transistorized bistable multivibrator including circuit connections to said connecting means and to said tabulator; relay means connected to said multivibrator and including circuit connections to said connecting means and to said tabulator operated in response to said multivibrator being in its first stable state in response to a signal transmitted from said tabulator after transmission of all of said directory number information to said tabulator to connect said connecting means to said timing means, said timing means including a circuit connection to said multivibrator, said switching means operated to connect a read out potential to said timing means via said connecting means, said timing means conducting said read out potential to said multivibrator in accordance with marked circuit paths representative of the duration of said call, said multivibrator reoperated to a second stable state in response to said read out potential to render said relay inoperative; said relay upon being rendered inoperative transmitting a marking signal to said tabulator indicative of the timing information recorded in said timer.

4. In an automatic toll ticketing telephone system, a calling station and a called station each having a directory number, means for establishing a circuit connection to permit a telephone conversation between said stations, including first switching means, a trunk circuit, a register sender, a tabulator and a ticketer including: individual circuit connections to said switching means, to said trunk circuit, to said register sender, and to said tabulator; a memory circuit comprising a plurality of magnetic cores, and connecting means including a plurality of individual circuit connections to each of said cores and a plurality of circuit connections to said register sender operated in response to a marking signal received from said register sender to complete a circuit path between said register sender and selected ones of said magnetic cores whereby marking potentials representative of said directory numbers are transmitted from said register sender to reverse the magnetic flux marking selected ones of said cores; a timer circuit operated in response to an answer signal returned from said trunk circuit to start timing said call, and further operated in response to a disconnect signal returned from said trunk to start timing of said call; and readout means comprising a reader circuit consisting of a transistorized bistable multivibrator including circuit connections to said connecting means and to said tabulator; second switching means connected to said multivibrator and including circuit connections to said connecting means and to said tabulator operated in response to said multivibrator being in its first stable state to operate said connecting means to sequentially connect a readout potential to each of said magnetic cores, a readout wire extending through said cores and connected to said multivibrator, operated in response to the connection of said readout potential to one of said marked cores to extend a readout signal to said multivibrator, said multivibrator operated to its second stable state in response to said readout signal to release said second switching means, said second switching means in response to release transmitting a marking signal to said tabulator indicative of the directory number information stored in said marked core, said switching means further operated in response to said multivibrator being in its first stable state in response to a signal transmitted from said tabulator after transmission of all of said directory number information to said tabulator to connect said connecting means to said timing means, said timing means including a circuit connection to said multivibrator, said second switching means reoperated to connect a readout potential to said timing means via said connecting means; said timing means conducting said readout potential to said multivibrator in accordance with marked circuit paths representative of the duration of said call, said multivibrator reoperated to its second stable state in response to said readout potential to release said second switching means, said second switching means in response to release transmitting a marking signal to said tabulator indicative of the timing information recorded in said timer.

References Cited in the file of this patent

UNITED STATES PATENTS

| | | |
|---|---|---|
| 2,767,246 | Retallack | Oct. 16, 1956 |
| 2,782,257 | Blashfield | Feb. 19, 1957 |
| 2,953,778 | Anderson et al. | Sept. 20, 1960 |
| 3,001,021 | Wright et al. | Sept. 19, 1961 |